Figures 1, 2:
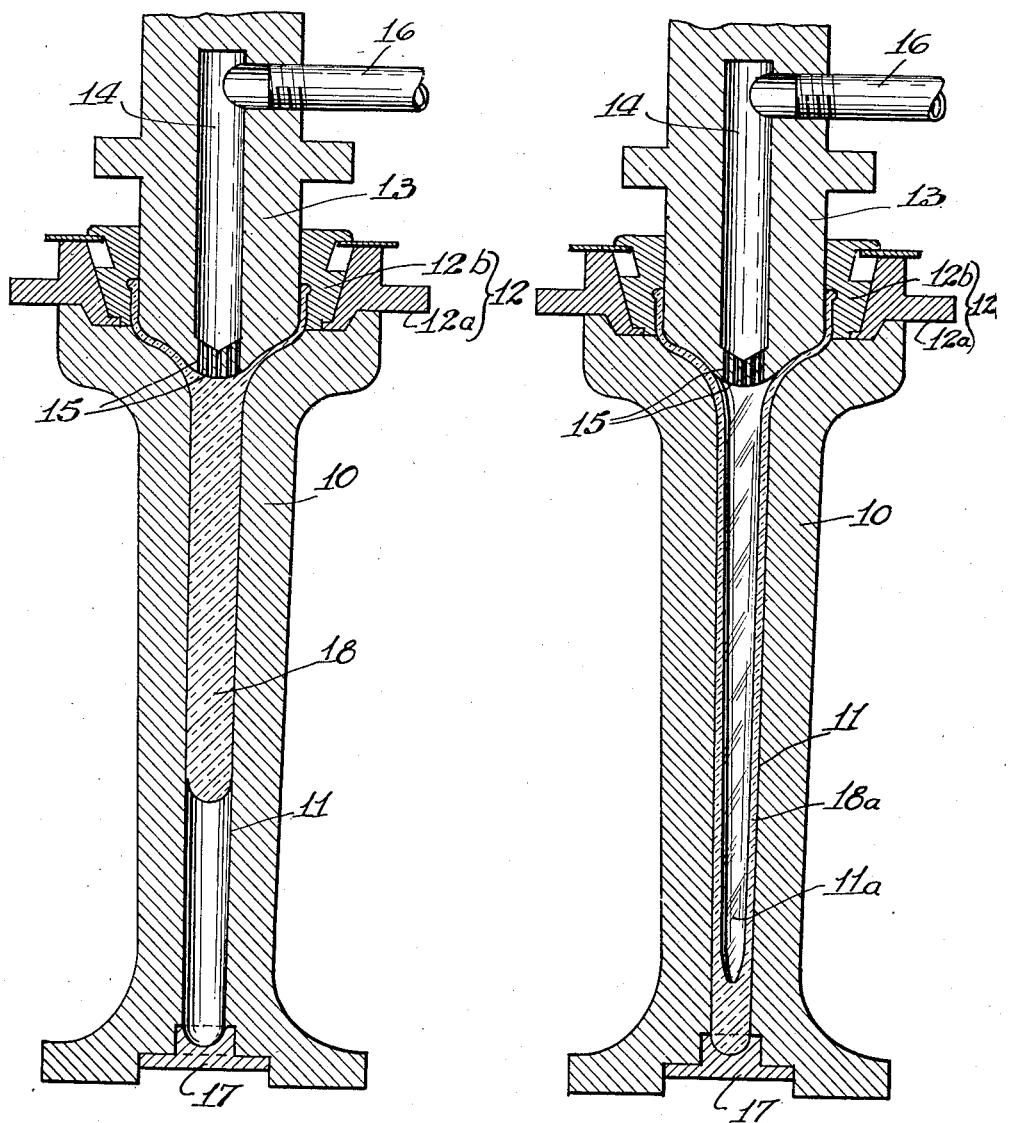

Jan. 4, 1944. E. SCHWARZ 2,338,269
METHOD OF MAKING GLASS STRUCTURES BY PRESSING AND BLOWING OPERATIONS
Filed Jan. 13, 1941 8 Sheets-Sheet 1

INVENTOR.
EUGENE SCHWARZ.
BY Albert C. Bell
ATTORNEY.

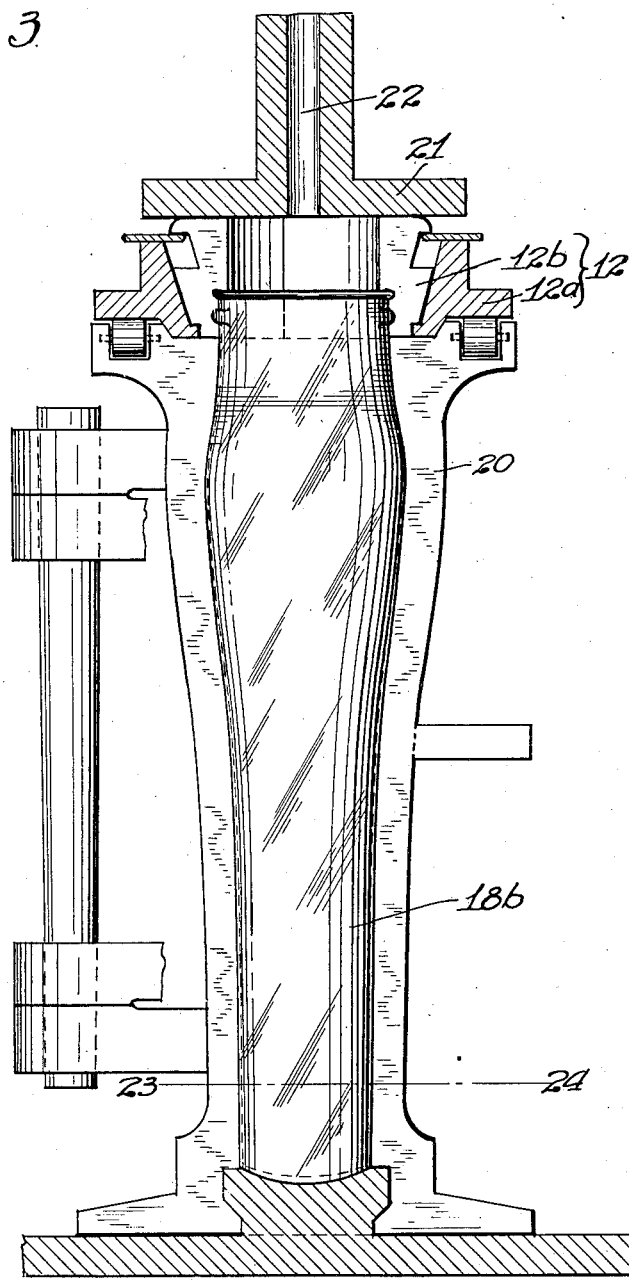

Jan. 4, 1944.  E. SCHWARZ  2,338,269
METHOD OF MAKING GLASS STRUCTURES BY PRESSING AND BLOWING OPERATIONS
Filed Jan. 13, 1941  8 Sheets-Sheet 3

INVENTOR.
EUGENE SCHWARZ
BY Albert E. Bell
ATTORNEY

Jan. 4, 1944.  E. SCHWARZ  2,338,269
METHOD OF MAKING GLASS STRUCTURES BY PRESSING AND BLOWING OPERATIONS
Filed Jan. 13, 1941  8 Sheets-Sheet 4

INVENTOR.
EUGENE SCHWARZ.
BY Albert E. Bell
ATTORNEY.

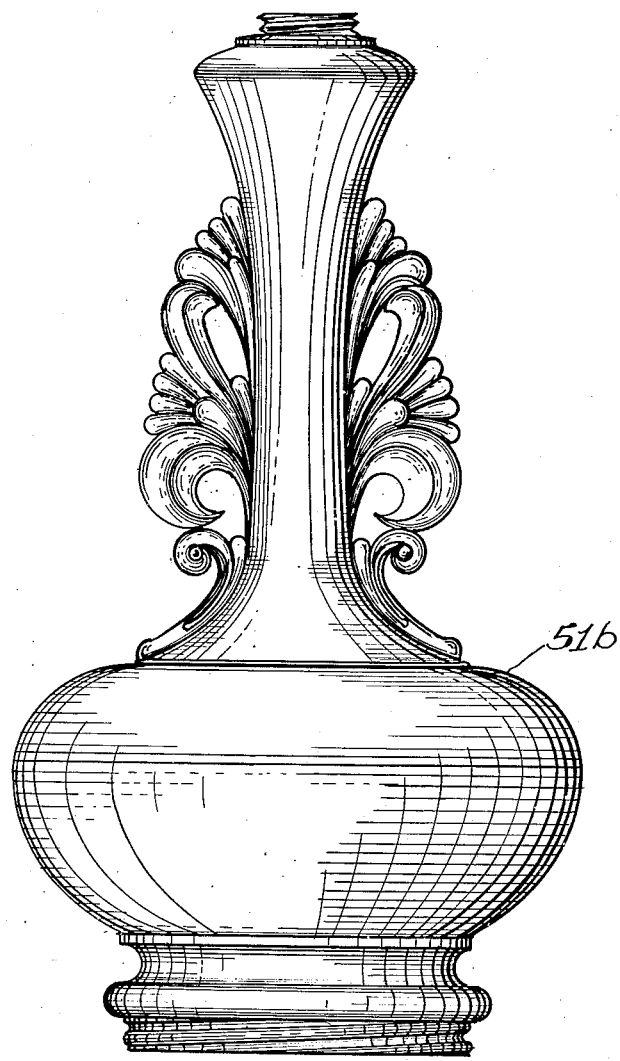

Jan. 4, 1944.  E. SCHWARZ  2,338,269
METHOD OF MAKING GLASS STRUCTURES BY PRESSING AND BLOWING OPERATIONS
Filed Jan. 13, 1941  8 Sheets-Sheet 6
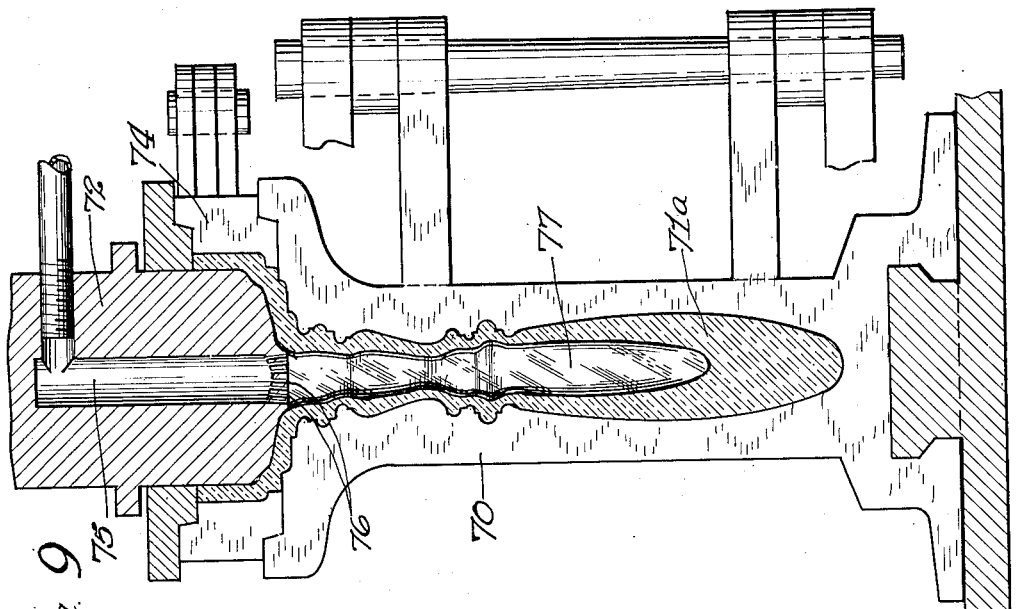
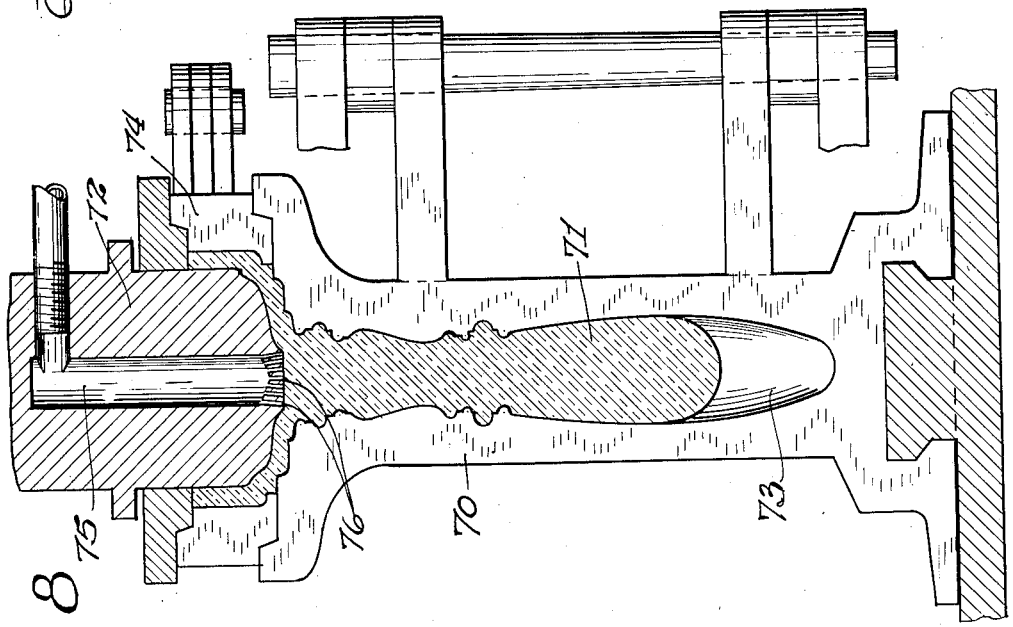
INVENTOR.
EUGENE SCHWARZ.
BY Albert E. Bell
ATTORNEY.

Jan. 4, 1944.　　　　　E. SCHWARZ　　　　　2,338,269
METHOD OF MAKING GLASS STRUCTURES BY PRESSING AND BLOWING OPERATIONS
Filed Jan. 13, 1941　　　8 Sheets-Sheet 7

INVENTOR.
EUGENE SCHWARZ.
BY Albert C. Bell
ATTORNEY.

Jan. 4, 1944. E. SCHWARZ 2,338,269
METHOD OF MAKING GLASS STRUCTURES BY PRESSING AND BLOWING OPERATIONS
Filed Jan. 13, 1941 8 Sheets-Sheet 8

INVENTOR.
EUGENE SCHWARZ.
BY Albert C. Bell
ATTORNEY

Patented Jan. 4, 1944

2,338,269

UNITED STATES PATENT OFFICE 2,338,269

METHOD OF MAKING GLASS STRUCTURES BY PRESSING AND BLOWING OPERATIONS

Eugene Schwarz, Alexandria, Ind., assignor to The Mantle Lamp Company of America, Chicago, Ill., a corporation of Illinois Application January 13, 1941, Serial No. 374,218

6 Claims. (Cl. 49—80)

The invention pertains to an improved method of making glass structures by pressing and blowing operations, particularly useful where it is desired to produce glass articles having long and relatively slender tubular conformations, and where the articles include also enlarged globular portions, examples of such articles being lamp chimneys, flasks, decanters and lamp stands.

The invention is applicable to machines for automatically and rapidly producing pressed and blown glass articles in quantity and includes two stages of operation, the first of which produces a parison of proper size and form to produce the completed article, and a second operation by which the parison is blown to form the completed article. Heretofore, in making pressed and blown glass articles without preliminary manual operations of any kind, and where two operations are desirable or necessary, it has been the practice to place a charge of molten glass in a first mold and then by pressure produced by a plunger, causing the glass to fill the mold in solid form, excepting the cavity that may be made in the formed parison by the plunger, after which the parison so formed is removed from the first mold and placed in a second and finishing mold and expanded in the second mold to the finished condition of the glass article by a blowing operation. This procedure has definite limitations resulting from the viscous nature of the molten glass, so that heretofore it has been practically impossible to produce by pressing and blowing operations of the kind just referred to, glass articles having long, slender, tubular necks or stems communicating with enlarged bodies or bulbs, such for example as water bottles, decanters and lamp stands.

The present invention differs from the practice used heretofore, in providing a parison mold such that the charge of molten glass placed in the mold is not large enough to fill the mold by a pressing operation, after which pressure is applied, for example by a plunger, to cause the charge to partly fill the parison mold, after which air under pressure is forced into the parison to expand it to fill the remaining portion or portions of the cavity of the parison mold. In doing this, it is preferable that the long, slender portion of the article be formed nearly so size and shape in the parison mold, although this is not always necessary, and in any event, the blowing operation besides filling the remaining portion or portions of the parison mold, has the effect of producing a substantial cavity and extending a substantial distance into the parison, determined by the amount of glass moved into the previously unfilled portion or portions of the mold, by the blowing operation. After the parison is formed in the manner described, it is transferred to a second or blow-mold, in which the still soft glass is further expanded by a blowing operation to completely fill the blow-mold and in this manner bulbs or globular forms of different kinds and of substantial size may be produced by the blowing operation, which are integral with the slender neck or stem portions of the articles, the pre-formed cavity in the parison serving to freely communicate the air under pressure in the blow-mold internally of the parison, to the parts thereof requiring to be expanded to fill the blow-mold.

In carrying out my invention, the parison mold may have a mold cavity of somewhat larger volume than can be filled by the pressing operation when a proper glass charge has been carefully measured, placed in the mold and then partly forced into the mold cavity by the plunger in the manner described. The blowing operation in the parison mold forms a cavity in the parison, which permits making pressed and blown glass articles in the second or blow-mold which heretofore have been regarded as impossible of construction by pressing and blowing operations. My invention generically, therefore, includes first pressing a glass charge in a parison mold to partly form a parison and then while the charge is under pressure, blowing air under pressure into the partly formed parison while still in the parison mold, to enlarge and complete the parison, after which the completed parison is transferred to a second or blow-mold, and the forming of the pressed and blown article is completed therein by a blowing operation which expands the parison to fill the blow-mold.

The invention will be best understood by reference to the accompanying drawings illustrating preferred embodiments of the invention, in which:

Fig. 1 shows in vertical, central, sectional view a parison mold for producing a lamp chimney, in which the glass charge is in the position resulting from a pressing operation, Fig. 2 shows in a view similar to Fig. 1, the mold illustrated in Fig. 1 with the parison completed in the mold by a blowing operation, Fig. 3 shows in vertical, central, sectional view a blow-mold for receiving the parison produced in Figs. 1 and 2, and illustrates the completely formed chimney resulting from a blowing operation in the blow-mold shown in Fig. 3.

Figure 5:
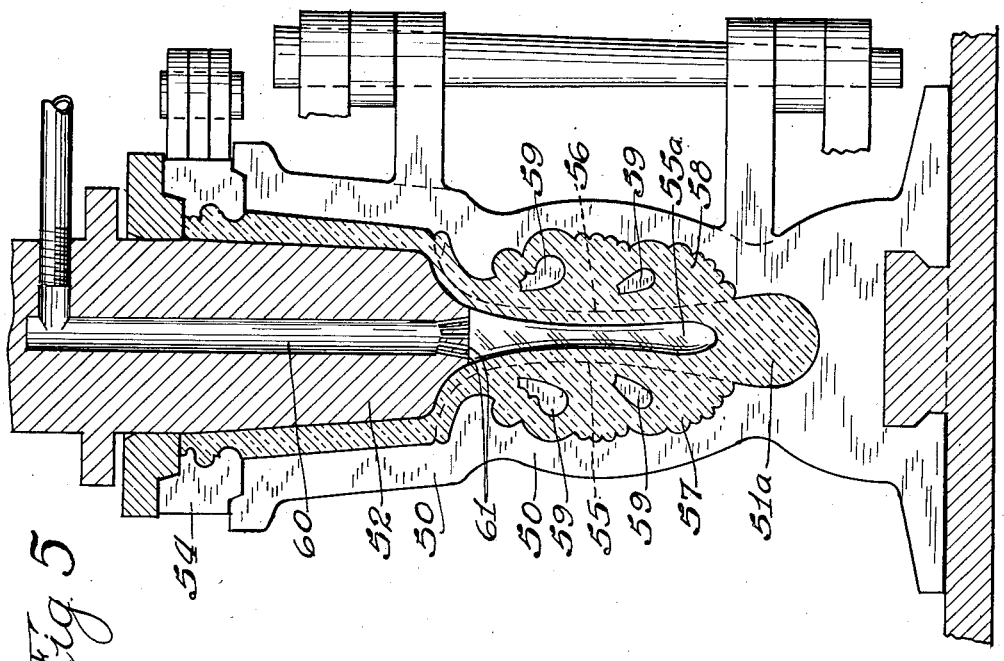
Figure 4:
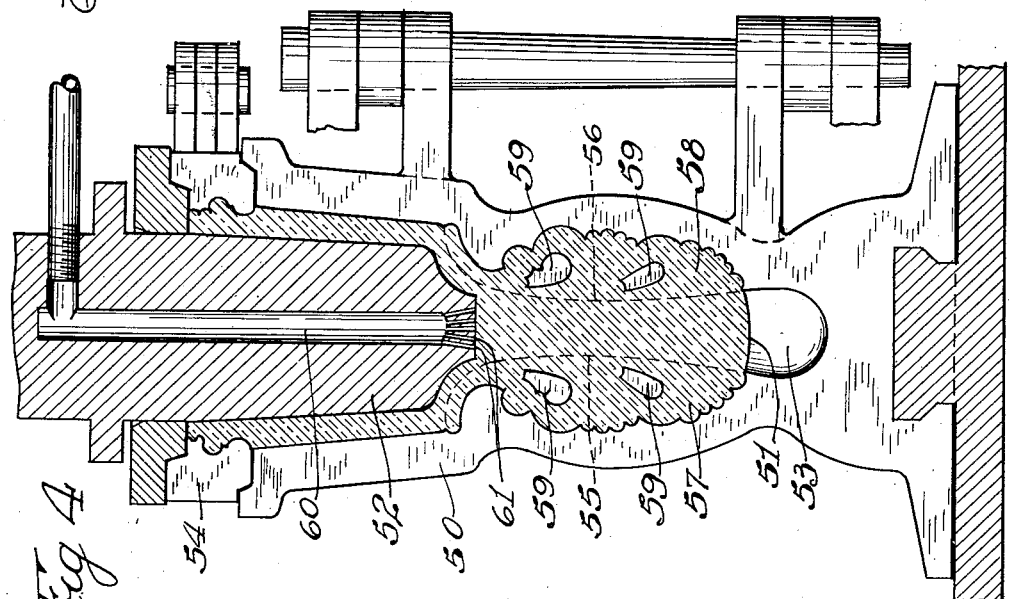
Figure 6:
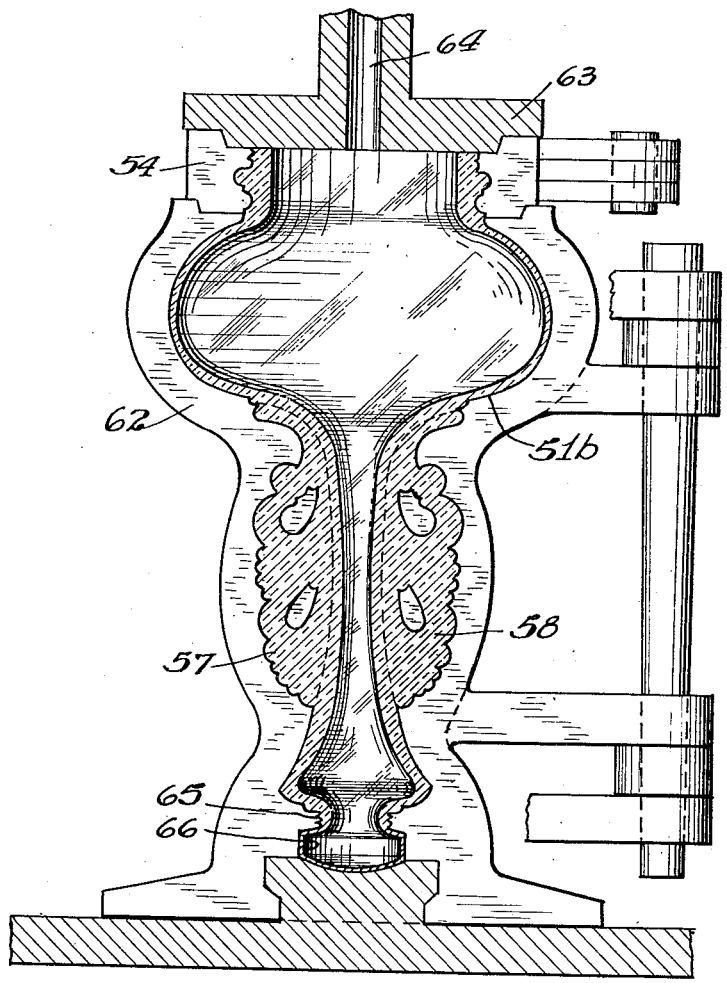
Figure 10:
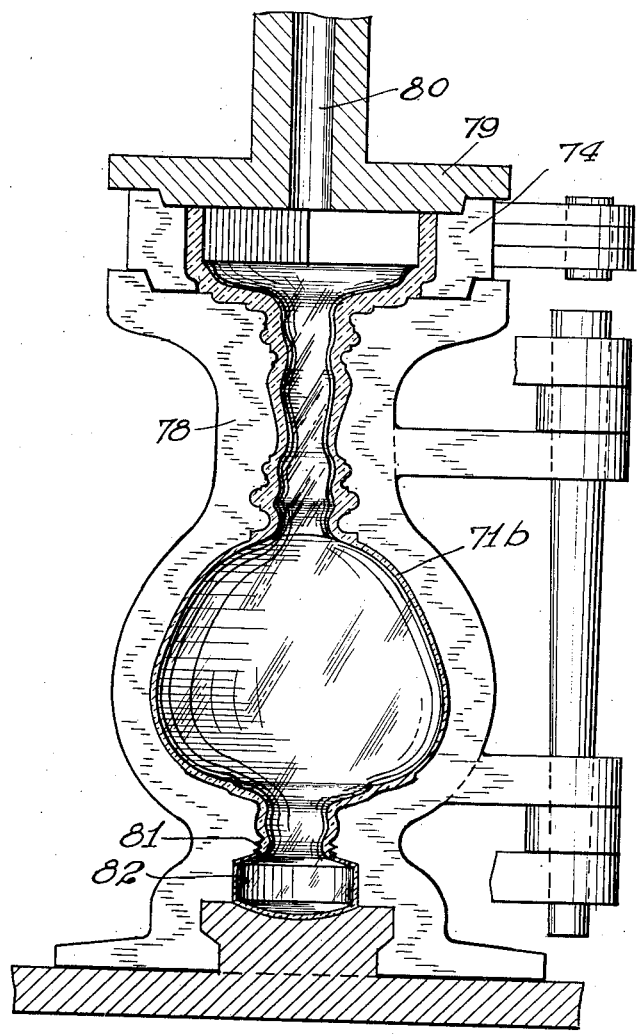
Figures 11, 12:
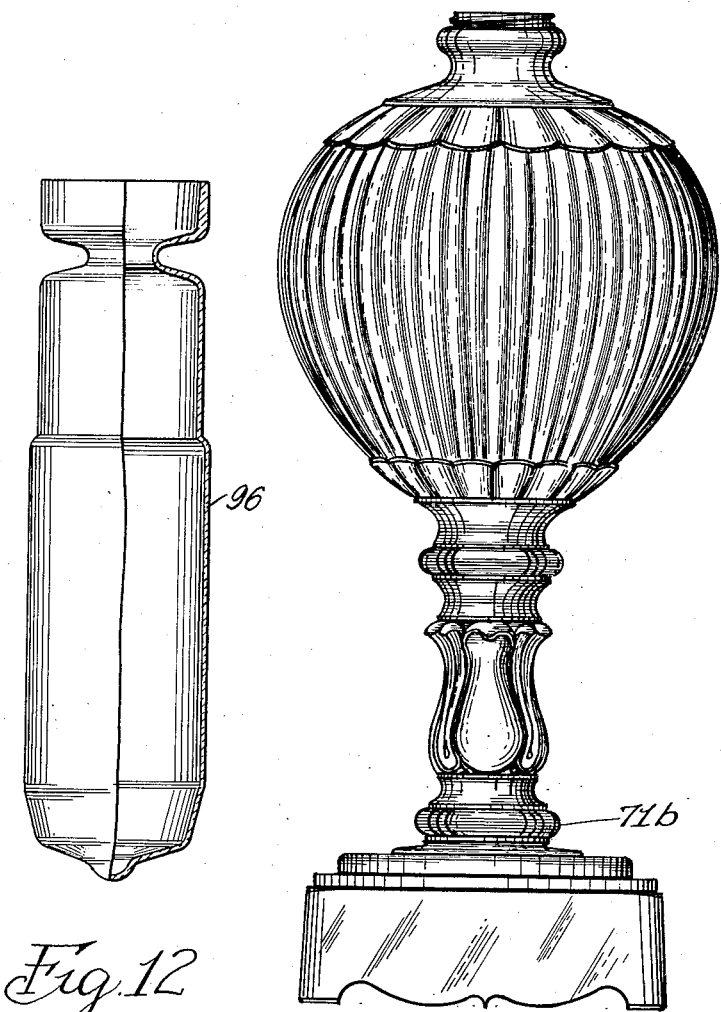

Fig. 4 shows in vertical, central, sectional view a parison mold for producing a lamp stand of the type having an enlarged bowl portion below an integral slender column portion, with a glass charge in the mold in the position taken by the charge at the end of a pressing operation, Fig. 5 shows in a view similar to Fig. 4, the mold illustrated in Fig. 4 with the parison in the mold expanded by a blowing operation to fill said mold, Fig. 6 shows in vertical, central, sectional view a blow-mold made to receive the parison completed as illustrated in Fig. 5, and illustrates the lamp stand in its final form in the blow-mold, as produced by a blowing operation, Fig. 7 shows in front elevation the lamp stand produced as illustrated in Figs. 4, 5 and 6, Fig. 8 shows in vertical, central, sectional view a parison mold for producing a lamp stand having an enlarged bowl portion above an integral slender column portion, with a glass charge in the mold in the position taken by the charge at the end of a pressing operation, Fig. 9 shows in a view similar to Fig. 8, the mold illustrated in Fig. 8 with the parison in the mold expanded by a blowing operation to fill said mold, Fig. 10 shows in vertical, central, sectional view, a blow-mold made to receive a parison completed as illustrated in Fig. 9, and illustrates the lamp stand in its final form in the blow-mold, as produced by a blowing operation, Fig. 11 shows in front elevation the lamp stand produced as illustrated in Figs. 8, 9 and 10, and Fig. 12 illustrates partly in front elevation and partly in vertical, sectional view, a type of vacuum bottle blank susceptible of being made by the method disclosed in the present application.

Similar numerals refer to similar parts throughout the several views.

As shown in Figs. 1 and 2, a mold 10 is illustrated, having a cavity of fixed volumetric capacity and having a long slender and slightly tapered bore 11, which mold is enlarged at its upper end and has resting thereon a transfer ring construction 12 having a cavity of the size and shape of the base portion of the lamp chimney to be made. The transfer ring is provided with a central cylindrical bore which is a sliding fit on a plunger 13, which plunger is provided with an air passage 14 extending axially in it nearly to its lower end where said passage communicates with a plurality of small diameter holes 15 extending through the lower end of the plunger. The upper portion of passageway 14 is continued laterally through a sidewall of the plunger for connection with an air pipe 16. The mold 10 is provided with a lower member 17 to close the lower end of the bore 11 and impart the desired form to the lower end of the completed parison.

In using the mold 10 shown in Figs. 1 and 2, the plunger 13 is raised and a measured charge or gob of glass in molten condition is placed in the cavity formed in the transfer ring 12, after which the plunger 13 is forced downwardly by a suitable press not shown, until it assumes the position shown in Fig. 1, for which position of the plunger the charge of glass is forced into the chimney pattern formed in the transfer ring 12, including any projecting members it may be desired to have on the exterior of the base of the chimney, and at the same time the bulk of the glass charge is forced to the position shown at 18, which it will be noted extends only partway down in the bore 11, leaving the lower portion of the bore unfilled. For this condition, the parison is partly completed and is in solid condition below the plunger 13 as illustrated in Fig. 1. Immediately that the plunger 13 is depressed to its position shown in Fig. 1, and with the plunger held in that position, air under pressure is admitted into the passageway 14 from a suitable source not shown, and the air pressure acting on the still molten glass below the plunger, forces it downwardly in the bore 11 to completely fill said bore, and in doing so a cavity 11a is produced in the parison 18a, extending from the lower surface of the plunger 13 nearly to the lower end of the parison, thus producing the completed parison 18a illustrated in Fig. 2.

Immediately after the parison is completed as described, the plunger 13 is raised, the transfer ring construction 12 is raised from the mold 10, lifting the completed parison from the mold 10, and the parison is transferred to the mold 20 illustrated in Fig. 3. After this is done, the upper end of the mold is closed by a cover plate 21 having an air passage 22 extending upwardly through it, and then air under pressure is forced into the parison through said passage 22 from a source not shown, and the still soft and plastic glass of the parison is expanded below the transfer ring construction, until it fills the mold 20, to form the completely blown chimney 18b. The mold 20 is of the split type to permit removing the blown chimney and the mold is preferably provided with means for rotating it against the outer surface of the blown chimney to finish said surface and eliminate the possibility of mold joints showing on the completed chimney. The blown chimney extends somewhat below the line 23—24, which is the line along which the lower end portion of the blown chimney will be separated from the body portion of the chimney to complete it after it is removed from the mold 20. The transfer ring construction 12 consists preferably of a solid outer ring 12a and an expansible and sectional inner ring 12b, so that when the blowing of the chimney has been completed and the chimney has been removed from the mold 20, the ring 12a may be lowered relatively to the ring 12b and the latter may then be expanded to free from the ring 12b any projecting portions that may be formed on the base of the chimney. Thus, with the exception of removing the closed end portion of the chimney resulting from the blowing operation, and finishing said chimney end by means well known in the art, the chimney is in completed condition when it is taken from the blow-mold 20.

In Fig. 4 I illustrate a parison mold 50 having a capacity of fixed volumetric capacity, for producing a lamp stand for an electric lamp, in which a bowl portion is provided on the finished lamp stand, which is below an integral slender column portion employed to support a lamp socket or sockets at its upper end. In this figure I illustrate a glass charge or gob 51 in the mold in the position it assumes as a result of forcing a plunger 52 into the mold, which causes the charge to fill the larger part of the parison mold, leaving the space 53 unfilled by the pressing operation. At the same time the base portion of the lamp stand is pressed to its final form in a transfer ring 54. The dotted lines 55 and 56 show the outline of the column itself, and the corresponding bore of the mold 50, from which column portion ornamental wing portions 57 and 58 extend with perforate portions therein formed by the members 59 of the mold. The ornamental portions 57 and 58 are formed in the plane of the section or sections of the mold, along which the mold may subsequently be opened to remove the parison from the mold.

Immediately that the parison is partly formed by the pressing operation as illustrated in Fig. 4, and with the plunger 52 held in the position there shown, air under pressure is supplied to a passageway 60 in the plunger 52, and delivered through small diameter holes 61 in the lower end of said plunger, to the interior of the pressed glass charge, which causes the pressed charge to expand and fill the parison mold as shown in Fig. 5 at 51a, at the same time forming in the parison a cavity 55a, thereby completing the parison.

When the parison has been formed as illustrated in Fig. 5, the plunger 52 is withdrawn, the mold 50 is opened, and the parison is transferred by means of the transfer ring 54 to a blow-mold 62 illustrated in Fig. 6, in which it is supported by the transfer ring, the upper end of the said ring being at once closed by a plate 63 provided with an air passage 64 by which air under pressure is at once admitted to the interior of the parison. The air under pressure expands the bowl portion to the form and size of the finished lamp stand, and also expands the lower portion of the neck of the lamp stand, which is the upper end portion of the completed article in use, at the same time forming threads 65 thereon for receiving the lamp socket or sockets to be supported by the lamp stand. The completed lamp stand 51b extends in the blow-mold below the threaded portion 65 in the form of a thin bubble 66 which may readily be removed after the lamp stand is taken from the blow-mold 62. The blowing operation serves to press the lamp stand firmly against the wall of the blow-mold so that it receives the impression of the blow-mold throughout its exterior surface, including the ornamental portions 57 and 58. In this manner, the blowing operation effected in the blow-mold, operates directly on the bowl portion of the lamp stand to form it and at the same time by means of the cavity 55a in the parison, the blowing operation becomes effective on the slender, integral neck of the lamp stand to complete its formation. When the finished lamp stand is removed from the blow-mold, and the bubble 66 is removed, the result is a lamp stand 51b as illustrated in Fig. 7.

In Fig. 8 I illustrate a mold 70 in vertical, central, sectional view, adapted to form a parison for a lamp stand for receiving an electric socket or sockets, in which the completed lamp stand is provided with an enlarged bowl above an integral, slender, column portion extending from the bowl portion to an integral base portion. The mold is shown with a glass charge 71 therein, in the form imparted to it by inserting a plunger 72 into the mold to cause the charge to partly fill the mold, leaving in the mold an unfilled space 73, to thus partly form the parison. It will be observed in this case that the plunger by entering the transfer ring 74, presses the base portion of the lamp stand into its final form within the transfer ring. Immediately after the pressing operation illustrated in Fig. 8, and with the plunger 72 in the position there shown, air under pressure is admitted to the passageway 75 in the plunger and forced through the small diameter holes 76 opening through the lower end of the plunger into the interior of the parison, by which the parison is expanded to the form 71a shown in Fig. 9 to fill the mold 70, at the same time forming a cavity 77 extending from the plunger 72 nearly to the lower end of the parison 71a.

When the parison is completed as illustrated at 71a in Fig. 9, it is transferred by means of the transfer ring 74 to a blow-mold 78 illustrated in Fig. 10, with the transfer ring 74 resting on the upper end of said mold, which transfer ring is at once closed by a plate 79 having therein a passageway 80 through which air under pressure is at once admitted to the interior of the formed parison, to expand it to fill the mold 78, and thereby complete the forming of the lamp stand 71b, during which it will be observed that the slender column portion of the lamp stand is expanded little if any because of having been preformed in the parison mold to substantially its final size and shape, the principal effect of the blowing operation in the mold 78 being to expand the lower portion of the parison by air flowing through the hollow column portion, to form the bowl portion of the lamp stand, as well as the threaded portion 81 which for the finished lamp stand becomes its upper end, the mold 78 having an enlarged portion below the threaded portion 81 to receive a bubble 82 having a thin wall to facilitate the ready removal of the bubble when the completed lamp stand is removed from the mold 78. In this way, it will be observed that the cavity 77 formed in the parison as illustrated in Fig. 9, facilitates the blowing of the bowl portion at a point remote from the admission of the air under pressure to the upper end of the blow-mold, and the completed lamp stand produced by the mold 78 may have the appearance shown at 71b for the finished lamp stand illustrated in Fig. 11.

Many different kinds of blown glass articles may be produced by blowing the parison in one or another of the ways described, before the final blowing operation is effected, for example blanks for vacuum bottles as illustrated at 96 in Fig. 12 may be so produced and glass tubes, either straight or tapered, as desired, may be produced by the steps of treatment described, which have different desired lengths, diameters and wall thicknesses.

By the means and steps of treatment described, I find I can produce parisons which are long and slender and at the same time tubular, so that the blown cavity in the parison structure permits the communication of air under pressure in the final blowing operation, to parts of the parison that otherwise would be inaccessible for effective blowing by the air under pressure, and in this manner many forms and shapes of glassware may be produced by pressing and blowing operations, that could not successfully be made by pressing and blowing operations as heretofore known. It will be understood that the operations described are susceptible of being performed in molding machines which may be automatic or semi-automatic as preferred, since no preliminary treatment of the glass is required, the only thing that is requisite in connection with the invention being that in addition to depositing the charge of glass in molten condition in the parison mold at the beginning of the process, the charge shall be measured so that it will but partly fill the parison mold at the end of the pressing operation, so that the parison may be completed by a blowing operation producing a cavity in the parison, which is of importance in communicating air under pressure during the final blowing operation to parts of the parison being blown, that are remote from the open end of the parison.

One of the important features characteristic of the method described, is the facility with which substantially uniform wall thickness of the glass articles may be produced. With previously known processes of pressing and blowing glass articles, it has been common in many cases to find that the wall thickness in some places was thick and in other places relatively thin, without there being any particular need for that kind of distribution, and in fact where in many cases a more uniform distribution of wall thickness would be preferred. By the method described, by properly forming the parison mold, properly determining the glass charge to be used in it, and by blowing the cavity in the parison while it is in the parison mold, in the manner stated, substantially uniform wall thickness may be produced where it is desired. I find that the wall thickness of the finished glass article adjacent the small diameter air inlet orifices, may be determined in considerable measure by the location of said orifices, that is to say, where the said orifices are centrally grouped in the part through which they are formed, the wall thickness of the article adjacent the orifices tends to be relatively thick, whereas with the said orifices disposed to be closely adjacent the inner surface of the tubular portion of the article so that said orifices are in annular arrangement, the adjacent wall thickness of the tubular portion of the article may be made relatively thin.

While I have shown my invention in the particular embodiment above described, and have illustrated my process by the particular steps of treatment described, I do not limit myself thereto as I may employ equivalents thereof without departing from the scope of the appended claims.

Having thus described my invention, what I claim is:

1. In the process of forming glass articles, the steps in parison making which include confining a charge of plastic glass in the top portion of a mold cavity of predetermined shape having a fixed volumetric capacity substantially in excess of the volume of said plastic charge, applying mechanical downward pressure to the charge to force the plastic glass downwardly to partially fill said mold cavity, and then applying fluid pressure to the top of said charge to expand said charge to completely fill said mold cavity and to form an internal cavity in said charge.

2. In the process of forming glass articles, the steps in parison making which include confining a charge of plastic glass in the top portion of a mold cavity of predetermined shape having a fixed volumetric capacity substantially in excess of the volume of said plastic charge, forming a cavity in the upper portion of said charge by downward mechanical pressure forcing the plastic glass downwardly to partially fill said mold cavity, and then applying fluid pressure to the cavity in said charge to expand said charge to fill said mold cavity and to substantially elongate the cavity first formed in said charge.

3. In the process of forming glass articles, the steps in parison making which include confining a charge of plastic glass in the top portion of a mold cavity of predetermined shape having a fixed volumetric capacity substantially in excess of the volume of said plastic charge, forming a cavity in said charge by downward mechanical pressure forcing the plastic glass downwardly to partially fill said mold cavity, and then applying fluid pressure to the cavity in said charge to complete the shaping of said charge to the contour of the mold cavity and to form an internal blown cavity in said charge substantially equal to the volume of the mold cavity not filled by said mechanical pressure.

4. In the process of making press-blown glass articles having hollow supporting bases, hollow column portions of relatively small diameter, and hollow bulbous portions of relatively large diameter, said base, column portion and bulbous portion of the article being integral and constituting a unitary structure, the steps in parison making which include confining a charge of plastic glass in the top portion of a mold cavity having a fixed volumetric capacity substantially in excess of the volume of said plastic charge and having base, column and bulbous portions corresponding to the article being made, applying downward mechanical pressure to said charge to force the plastic glass downwardly to partially fill said mold cavity, and then applying fluid pressure to the top of said charge to expand said charge to completely fill said mold cavity and to form an internal cavity in the column portion of said charge.

5. In the process of making press-blown glass articles having hollow supporting bases, hollow column portions of relatively small diameter adjacent and above said bases, and hollow bulbous portions of relatively large diameter adjacent and above said column portions, said base, column portion and bulbous portion of the article being integral and constituting a unitary structure, the steps in parison making which include confining a charge of plastic glass in the top portion of a mold cavity having a fixed volumetric capacity substantially in excess of the volume of said plastic charge and having base, column and bulbous portions corresponding to the article being made, applying an initial downward mechanical pressure to said charge to force the plastic glass downwardly to partially fill said mold cavity, and then applying fluid pressure to the top of said charge to expand said charge to completely fill said mold cavity and to form an internal cavity through the column portion of said charge and into the bulbous portion thereof.

6. In the process of making press-blown glass articles having hollow supporting bases, hollow bulbous portions of relatively large diameter adjacent and above said bases, and hollow column portions of relatively small diameter adjacent and above said bulbous portions, said base, bulbous portion and column portion of the article being integral and constituting a unitary structure, the steps in parison making which include confining a charge of plastic glass in the top portion of a mold cavity having a fixed volumetric capacity substantially in excess of the volume of said plastic charge and having base, bulbous and column portions corresponding to the article being made, applying an initial downward mechanical pressure to said charge to force the plastic glass downwarly to partally fill said mold cavity, and then applying fluid pressure to said charge to expand said charge to completely fill said mold cavity and to form an internal cavity through the bulbous portion of said charge and into the column portion thereof.

EUGENE SCHWARZ.

2,338,269

CERTIFICATE OF CORRECTION.

Patent No. 2,338,269.  January 4, 1944.

EUGENE SCHWARZ.

It is hereby certified that error appears in the printed specification of the above numbered patent requiring correction as follows: Page 1, first column, line 48, for "so" read --to--; page 2, second column, line 58, for "capacity" first occurrence, read --cavity--; line 63, for "of" read --or--; page 4, second column, line 66, for "downwarly" read --downwardly--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.